United States Patent Office 3,564,034
Patented Feb. 16, 1971

3,564,034
PROCESS FOR THE PREPARATION OF
1,3-DIFERROCENYL-1-BUTENE
Charles S. Combs, Jr., and William D. Stephens, Huntsville, Ala., assignors to Thiokol Chemical Corporation, Bristol, Pa., a corporation of Delaware
No Drawing. Filed Aug. 16, 1968, Ser. No. 753,078
Int. Cl. C07f 15/02; C10d 9/10
U.S. Cl. 260—439       6 Claims

ABSTRACT OF THE DISCLOSURE

A process for the preparation of a combustion modifier 1,3-diferrocenyl-1-butene by the reaction of 1-ferrocenylethanol with acid anhydrides, such as for example acetic anhydride.

BACKGROUND OF THE INVENTION

(1) Field of the invention

There have been great demands for increasing the burning rates of composite solid propellants and one of the solutions that has been found to be successful is the addition to the composite solid propellant of a combustion modifier.

This invention, therefore, relates to a process that will provide a combustion modifier 1,3-diferrocenyl-1-butene that may be produced at a reasonable cost.

(2) Description of the prior art

Ferrocene is a term commonly used to describe bis-(cyclopentadienyl) iron, and 1,3-diferrocenyl-1-butene is a liquid ferrocene derivative which is useful as a combustion modifier to increase the burning rate composite solid propellants.

The preparation of 1,3-diferrocenyl-1-butene, as set forth in the Journal of Organic Chemistry, 32, 4070 (1967), S. L. Goldburg, W. D. Lobele and T. T. Tidwell, employs large amounts of an expensive dehydrating agent, as well as large amounts of solvent, and affords the compound in only moderate yield, thereby prohibiting commercial production of the material at a reasonable cost. It became necessary, therefore, to find a less expensive method for preparing 1,3-diferrocenyl-1-butene and the instant invention relates to such a method of preparation.

SUMMARY OF THE INVENTION

This invention, therefore, relates to an improved process useful in the preparation of 1,3-diferrocenyl-1-butene, and more specifically, this invention relates to a novel preparation of 1,3-diferrocenyl-1-butene by the reaction of 1-ferrocenylethanol with acid anhydrides, such as acetic anhydride.

Thus, it may be said that this invention generally relates to a process for the preparation of an organometallic compound that is useful as a combustion modifier in solid propellants.

More generally this invention relates to a process that results in a low product cost, because of the inexpensive materials that are used and the excellent yield of 1,3-diferrocenyl-1-butene that results from such a process.

It is an object of this invention, therefore, to provide a process that will inexpensively produce 1,3-diferrocenyl-1-butene that will be useful as a combustion modifier for composite solid propellants.

The above and other objects and advantages will, it is believed, become more apparent to one skilled in the art from the following detailed description and discussion.

DESCRIPTION OF THE PREFERRED EMBODIMENTS

The process embodying the instant invention gives access to a useful material which would otherwise be inaccessible due to the prohibitively high cost associated with its prior preparation.

The process, as will be described, entails the mixture of 1-ferrocenylethanol with an acid anhydride followed by the application of sufficient heat to force the reaction to proceed at a reasonable rate.

Typically the acid anhydride is used in an excess of 2/1. (mole/mole) or greater with the 1-ferrocenylethanol, and the temperature is above 25° C., usually at least 75° C., up to the boiling point of the acid anhydride. Preferably, the reaction temperature approaches or is equal to the boiling point of the acid anhydride.

At the completion of reaction the 1,3-diferrocenyl-1-butene may be conveniently isolated by any process suitable for the removal of the acid anhydride and acid (produced by the reaction) mixture.

The reaction mixture is normally poured into water, after which the supernatant liquid is decanted. The removal of residual supernatant liquid is accomplished by distillation. If a product of analytical purity is desired the 1,3-diferrocenyl-1-butene may be chromatographed on alumina or other suitable substrates.

The following examples are given in order to more specifically explain the invention and as such should not be construed as limitations on the instant invention.

EXAMPLE 1

1-ferrocenylethanol (50 g.) is refluxed for one hour in 100 ml. of acetic anhydride. The reaction mixture is poured into 100 ml. of water and stirred for 30 minutes, after which the supernatant liquid is decanted. Residual acetic acid and water are removed by azeotropic distillation with toluene. The 1,3-diferrocenyl-1-butene is dissolved in methylene chloride and chromatographed on alumina affording a yield of pure product equal to 94% of theoretical.

EXAMPLE 2

Operating according to the procedure cited in Example 1, 1-ferrocenylethanol is allowed to react with acetic anhydride for 5 hours at 90° C. to provide a comparable yield of 1,3-diferrocenyl-1-butene.

There has thus been described a process whereby 1,3-diferrocenyl-1-butene may be prepared inexpensively and in high yield.

It is to be understood, therefore, that while the present invention has been described by means of specific examples, it should not be limited thereto, for obvious variations and modifications may occur to those skilled in the art and such variations and modifications may be adhered to without departing from the spirit of the invention or the scope of the appended claims.

Having thus described the invention, what is claimed as new and desired to be secured by Letters Patent is:

1. A process for producing 1,3-diferrocenyl-1-butene by means of the reaction of 1-ferrocenylethanol with an excess of acetic acid anhydride at a temperature of at least 75° C.

2. A process as in claim 1, wherein the 1-ferrocenylethanol is allowed to react with the acetic anhydride for 5 hours at 90° C.

3. A process as in claim 1 wherein the temperature is the boiling point of the acetic acid anhydride.

4. A process as in claim 1 wherein a product of analytical purity is obtained by chromatographing the 1,3-diferrocenyl-1-butene on alumina and other suitable substrates.

5. A process as in claim 4 wherein the 1,3-diferrocenyl-1-butene is dissolved in methylene chloride before chromatographing.

6. A process as in claim 1 wherein the 1-ferrocenylethanol is refluxed for one hour in the acetic acid anhydride, the resulting mixture is poured into water and stirred, the superantant liquid is then decanted and any residual acetic acid anhydride and water are removed by azeotropic distillation with toluene.

References Cited

Rosenblum: Chemistry of the Iron Group Metallocenes, John Wiley and Sons, New York, N.Y., 1965, p. 134.

Buell et al.: J. Am. Chem. Soc., 84 (1962), pp. 40–42.

TOBIAS E. LEVOW, Primary Examiner

A. P. DEMERS, Assistant Examiner

U.S. Cl. X.R.

44—4